United States Patent [19]

Pugh et al.

[11] Patent Number: 4,691,968

[45] Date of Patent: Sep. 8, 1987

[54] DUAL CIRCUIT BRAKE VALVE

[75] Inventors: James G. Pugh, Elyria; Duane R. Johnson, Oberlin; Roy E. Bartholomew, Elyria, all of Ohio

[73] Assignee: Allied Corporation, Morristown, N.J.

[21] Appl. No.: 831,891

[22] Filed: Feb. 24, 1986

[51] Int. Cl.⁴ .............................................. B60T 15/06
[52] U.S. Cl. ................................... 303/52; 137/627.5; 303/40
[58] Field of Search .................... 303/50-56, 303/40, 9, 7, 8, 28-30, 13, 6; 137/627.5; 188/216

[56] References Cited

U.S. PATENT DOCUMENTS

| | | | |
|---|---|---|---|
| 3,183,042 | 5/1965 | Bueler | 303/52 |
| 3,207,561 | 9/1965 | Bueler | 303/52 |
| 3,279,867 | 10/1966 | Bueler | 303/52 |
| 3,291,539 | 12/1966 | Bueler | 303/52 |
| 3,480,334 | 11/1969 | Cruse | 303/52 X |
| 3,549,208 | 12/1970 | Cruse | 303/52 X |
| 3,572,846 | 3/1971 | Cruse | 303/52 X |
| 3,580,646 | 5/1971 | Ternent | 303/52 |
| 3,992,065 | 11/1976 | Pekrul | 303/52 X |
| 4,482,191 | 11/1984 | Beck et al. | 303/52 |

FOREIGN PATENT DOCUMENTS

| | | | |
|---|---|---|---|
| 2097878 | 11/1982 | United Kingdom | 303/52 |
| 2153466 | 8/1985 | United Kingdom | 303/52 |

Primary Examiner—Douglas C. Butler
Attorney, Agent, or Firm—Ken C. Decker; William N. Antonis

[57] ABSTRACT

A dual circuit brake valve includes a plunger assembly carrying the primary valve seat, and the primary valve plunger within the primary piston. A pair of axially-spaced, circumferentially extending bearing members extend from the primary piston slidably engaging larger and smaller diameter portions of the bore of the housing to thereby guide the primary piston independently of other components within the housing. The secondary set of valve actuating members is actuated by a relay piston which is similarly guided in larger and smaller diameters of the bore independently of other components within the valve housing. The primary piston defines a pressure effective area due to the difference in the larger and smaller portions, so that inlet port pressure acting on the effective area yieldably urges the plunger toward the brake released position.

10 Claims, 1 Drawing Figure

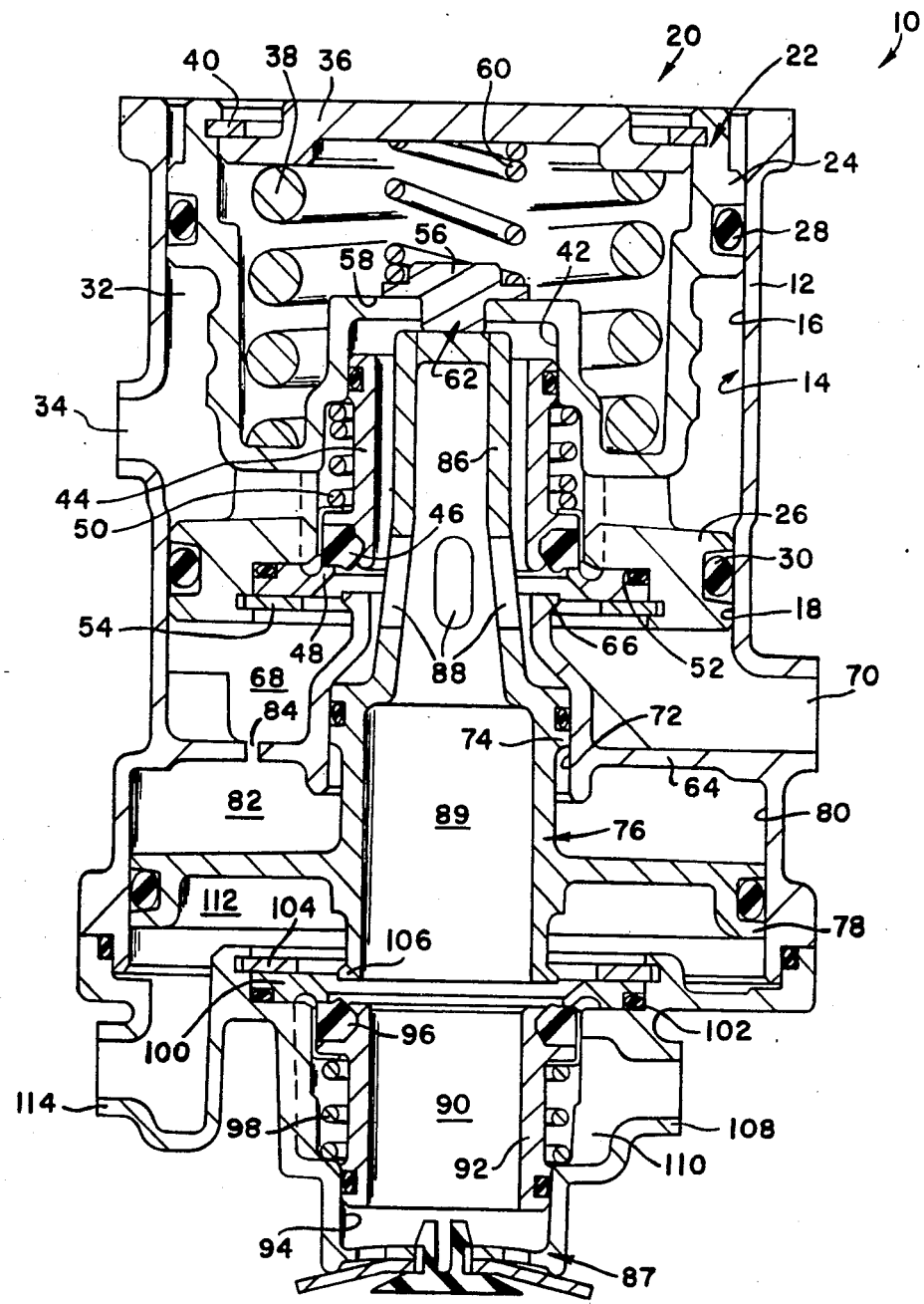

ding systems.

DUAL CIRCUIT BRAKE VALVE

This invention relates to a dual circuit brake valve for a vehicle having primary and secondary fluid pressure braking systems.

Modern heavy duty vehicles are equipped with air brakes, and are normally provided with both primary and secondary service brake actuation systems. Accordingly, these systems require a dual circuit brake valve (which is operated by a conventional treadle mounted in the vehicle operator's compartment) to simultaneously communicate air pressure through the primary and secondary circuits when a brake application is effected. A typical prior art dual circuit brake valve is illustrated in U.S. Pat. No. 3,580,646 issued May 25, 1971 to Ternent.

In such prior art brake valves, the components controlling communication in both the primary and secondary circuits guide and are piloted by components which control communication through the opposite circuit. This relationship allows adverse eccentric side loads to be transmitted between the components, which can contribute to abnormal wear of the parts, and may cause the parts to bind. Accordingly, the present device has advantages over the prior art brake valves in that the primary circuit valve seat and poppet are both slidably mounted in a replaceable cartridge plunger assembly which is slidably mounted in the valve housing. The plunger assembly can be easily removed and can be replaced as a unit if it is defective, thus making the valve easier to service than prior art valves.

Furthermore, the plunger assembly is provided with radially projecting, circumferentially extending, axially spaced bearing members which slidably engage the wall of the housing bore, thereby guiding the plunger assembly at axially spaced stations to thereby prevent twisting and cocking of the plunger assembly. The bearing members engage stepped portions of the bore, so that the effective area of one of the bearing members is larger than the other bearing member. The bearing members cooperate to define an inlet cavity communicated to an inlet port. Fluid pressure communicated to the inlet port and into the inlet cavity, acting on the effective area of the plunger, urges the plunger to the brake released position.

These and other advantages of the present invention will become apparent from the following specification, with reference to the accompanying drawing, the sole FIGURE of which is a longitudinal cross sectional view of a dual circuit brake valve made pursuant to the teachings of the present invention.

Referring now to the drawing, a dual circuit brake valve generally indicated by the numeral 10 includes a housing 12 defining a bore generally indicated by the numeral 14. Bore 14 is stepped to define a larger diameter portion 16 and a smaller diameter portion 18. A plunger assembly generally indicated by the numeral 20 is slidably mounted in the bore 14. Plunger assembly 20 includes a primary piston 22 which includes bearing members 24, 26 which project radially from the primary piston 22 and extend circumferentially thereabout. The bearing members 24, 26 carry circumferentially extending seals 28, 30. Bearing member 24 and seal 28 slidably engage the larger portion 16 of the bore 14, and bearing member 26 and its associated seal 30 slidably engage the smaller diameter portion 18 of the bore 16.

The bearing members 24, 26 cooperate with the wall of the bore 14 and the primary piston 22 to define an inlet chamber 32 therebetween which is communicated with an inlet port 34. Since bearing member 24 is slidably mounted in the larger portion of the bore 14 and the bearing member 26 is slidably mounted in the smaller portion of the bore 14, a net effective area is defined on the primary piston 22. Air pressure communicated through the inlet port 34 acting upon this effective area tends to urge the plunger assembly 20 upwardly viewing the FIGURE.

Plunger assembly 20 further includes a treadle plate 36 which is engaged by the operating treadle (not shown) mounted in the vehicle operator's compartment and which applies a downward force on treadle plate 36 when a brake application is effected. A graduating spring 38 yieldably urges the treadle plate 36 into engagement with a stop ring 40 mounted on the primary piston 22. The primary piston 22 further defines an inner bore 42 which slidably receives a valve poppet 44 which carries a circumferentially extending sealing member 46. A spring 50 urges valve poppet 44 into sealing engagement with a valve seat 48 which is carried by the primary piston 22. Valve seat 48 is a circumferentially extending ring which is received in a recess 52 which extends circumferentially around the lower portion of the primary piston 22 viewing the FIGURE, and which is held in place by a snap ring 54. Accordingly, the plunger assembly 20 consists of a removable cartridge comprising the primary piston 22, the valve poppet 44, and the valve seat 48, and their associated springs, seals and retaining or snap rings. This cartridge may be removed and replaced as a unit when the valve is serviced, and is installed in the housing 12 as a unit when the valve is manufactured, thus simplifying manufacturing and servicing of the valve assembly 10. The plunger assembly 20 further includes a force transmitting member 56 which is urged against surface 58 of the primary piston 22 by a spring 60, for a purpose to be hereinafter described. Force transmitting member 56 includes a portion 62 which projects through an aperture in the primary piston 22.

Housing 12 further includes an inwardly extending partition 64 that divides the housing into the primary section which receives the plunger assembly 20 and a secondary section. Partition 64 carries a circumferentially extending valve seat 66 which is positioned to be engaged by the seal 46 carried by the poppet 44. Partition 64 cooperates with the primary piston 22 to define an annular delivery chamber 68 therebetween which is communicated with a primary circuit outlet or delivery port 70.

The partition 64 defines a bore 72 which slidably receives a bearing portion 74 of a relay piston generally indicated by the numeral 76. Relay piston 76 further includes another bearing surface 78 that is slidably engaged with portion 80 of the bore 14. Relay piston 76 cooperates with the partition 64 to define a relay cavity 82 therebetween which communicates with delivery chamber 68 through an aperture 84. Relay piston 76 further includes a projecting stem 86 which projects into the aperture defined within the annular poppet 44. Stem 86 is provided with elongated apertures 88 to communicate delivery chamber 68 with an exhaust port generally indicated by the numeral 87 which is provided on the lower most portion of the housing 12 viewing the FIGURE. The relay piston 76 defines a passage 89 therewithin which cooperates with corresponding passage 90 defined within an annular poppet member 92 to communicate the apertures 88 with the exhaust port 87.

Poppet 92 is slidably mounted in a bore 94 defined within the housing 12 and carries a circumferentially extending seal 96. A spring 98 yieldably urges the poppet member 92 into sealing engagement with an annular valve seat 100. The valve seat 100 is similar to the valve seat 48 and consists of an annular ring which is releasably held by a snap ring 104 in a circumferentially extending recess 102 provided in the wall of the housing 12. The relay piston 76 is provided with a circumferentially extending valve seat 106 at its lower most portion viewing the FIGURE which is adapted to sealingly engage the seal 96 when the relay piston 76 is urged downwardly viewing the FIGURE.

An inlet or supply port 108 is communicated to the secondary braking system and communicates fluid into an inlet chamber 110 which is normally closed by engagement of the seal 96 carried by the poppet 92 against the valve seat 100. The relay piston 76 cooperates with the housing 12 to define a delivery chamber 112 therebetween, which is communicated to a delivery port 114 which is also connected to the secondary braking circuit.

MODE OF OPERATION

In operation, the various components of the valve 10 are illustrated in the FIGURE in the positions which they assume when the brakes of the vehicle are released. In this condition, supply air is communicated through the inlet port 34 into the inlet chamber 32. However, since the spring 50 urges the seal 46 against the valve seat 48, further communication of fluid pressure into the valve housing 12 through the inlet port 34 is blocked. Because of the unbalanced area on the plunger assembly 20 as discussed hereinabove, air pressure communicated into the chamber 32 acts across this unbalanced area to provide a net upward force on the plunger assembly 20 to urge the latter into the position illustrated in the Drawing. At the same time, air is communicated through the secondary braking circuit through the supply or inlet port 108 into the inlet chamber 110. Further communication of air pressure into the valve housing 12 through inlet or supply port 108 is blocked due to the sealing engagement of the seal 96 against the valve seat 100. The delivery port 70 and delivery chamber 68 are communicated to the exhaust port 87 through the slots 88 and passages 89 and 90. Similarly, delivery port 114 and delivery chamber 112 are communicated to the exhaust port 87 through the passage 90.

When a brake actuation is effected, the operator operates the aforementioned treadle, which forces the treadle disc 36 downwardly viewing the FIGURE, thereby partially compressing graduating spring 38. Accordingly, primary piston 22 is also forced downwardly, thereby urging the seal 46 into sealing engagement with the valve seat 66, to thereby cut off communication between the delivery port 70 and the exhaust port 87. This position, in which the seal 46 is engaged with both the valve seat 66 and the valve seat 48 is called the "lapped position". As the primary piston 22 is moved into the lapped position, movement of the primary piston 22 relative to the relay piston 76 causes the force of the spring 60 to be transferred to the relay piston 76 through the stem 86. Accordingly, spring 60 also forces the relay piston 76 downwardly viewing the FIGURE, bringing the valve seat 106 into sealing engagement with the seal 96. The force of spring 60 is less than the force of the spring 98 and the load exerted by fluid pressure in chamber 110, so that the seal 96 is not urged away from the seat 100. However, the force of the spring 60 is a significant fraction of that of the spring 98, so that the forces biasing the seal 96 into engagement with the seat 100 is substantially reduced, thereby requiring only a minimal "crack open" force to be applied to the poppet 92 in order to urge the seal 96 away from the valve seat 100.

Additional downward movement (viewing the FIGURE) of the treadle plate 36 is sufficient to urge the valve seat 48 away from the seal 46, which remains engaged with the valve seat 66. Accordingly, fluid pressure is communicated from the inlet port 34 to the delivery or outlet port 70 through the valve seat 48. However, the higher pressure thereby created at the delivery port 70 reacts against the primary piston 22, the lower most face of which is exposed to the fluid pressure level in the delivery chamber 68. Accordingly, the primary piston is urged upwardly viewing the FIGURE, until the fluid pressure force applied to the primary piston 24 by pressure at delivery port 70 balances the compression of the spring 38 generated by operation of the treadle in the operator's compartment. At the same time, the increased pressure in the delivery chamber 68 is communicated through the aperture 84 into the relay chamber 82, where it acts upon the relay valve 76 to urge the latter downwardly viewing the FIGURE. Since the relay piston 76 has already been moved into the lapped position thereby relieving substantially the pressure exerted by spring 98, the valve poppet 96 will almost immediately be moved away from the valve seat 100 to allow pressure to communicate to the delivery port 114. Accordingly, when pressure in delivery chamber 112 balances the pressure in relay chamber 82, the poppet 92 is allowed to move back to the lapped position.

If the vehicle operator increases the pressure on plate 36, additional pressure will be communicated to the delivery ports 70 and 114 as described hereinabove. If the pressure on the plate 36 is reduced, thereby reducing the compression of graduating spring 38, the then higher pressure at the delivery port 70 exerts an upward force on the primary piston 22, thereby cracking the valve seat 66 open to allow fluid pressure to escape through the exhaust port 87 until the pressure at delivery port 70 again balances the compression of graduating spring 38, whereupon the valve members move back to the lapped position. A similar pressure change is effected in relay chamber 82, thereby controlling the pressure in the secondary circuit accordingly.

When the brakes of the vehicle are released, the graduating spring urges the valve plate 36 back to the position illustrated in the drawing. The higher pressure in the inlet chamber 32 urges the plunger assembly 20 back to the position illustrated. The relay piston 76 is urged to the position illustrated by the higher pressure in delivery chamber 112, as it escapes to atmosphere through exhaust port 87.

We claim:
1. Dual brake valve comprising a housing having a pair of inlets, a pair of outlets, and an exhaust, said housing defining a stepped bore therewithin having larger and smaller diameter portions, an operator-actuated stepped plunger assembly slidably mounted in said bore having larger and smaller diameter sections slidably engaged with the larger and smaller diameter portions of the bore, a first set of cooperating valve members mounted in said bore and adapted to control communication between said exhaust, one of said inlets, and a corresponding one of said outlets, a second set of cooperating valve members mounted in said bore and adapted to control communication between said exhaust, the other inlet, and the other outlet, said plunger assembly operating said first set of cooperating valve members to control opening and closing of fluid communication between said one inlet, said exhaust and the corresponding outlet, and means operated by said plunger assembly for operating said second set of cooperating valve members to control communication between said exhaust, the other inlet and the other outlet in accordance with said first set of cooperating valve members, said plunger assembly cooperating with the wall of said bore to define an inlet chamber communicating with said one inlet and presenting a fluid pressure effective area equal to the differential area between the sections of the plunger assembly whereby the fluid pressure level in said inlet chamber acts on the differential area to urge the plunger assembly toward a position establishing a predetermined condition of said first and second sets of cooperating valve members.

2. circuit brake valve as claimed in claim 1, wherein said plunger assembly includes a pair of axially spaced, circumferentially extending bearing members slidably engaging the larger and smaller diameter portions of the bore, said bearing members cooperating with each other, the wall of the bore, and the outer surface of plunger assembly to define said inlet chamber.

3. Dual circuit brake valve as claimed in claim 1, wherein said means for operating said second set of cooperating valve members includes a stem slidably mounted in said bore, and means for transferring a predetermined load to said stem upon actuation of the plunger assembly.

4. Dual circuit brake valve as claimed in claim 1, wherein said second set of cooperating valve members includes third and fourth valve seats mounted in said bore, a second valve poppet for engagement with said third and fourth valve seats, at least one of said third and fourth valve seats comprising a ring mounted coaxial in said bore, and means releasable mounting said ring within said housing for engagement by said second valve poppet.

5. Dual circuit brake valve as claimed in claim 1, wherein said second set of cooperating valve members includes a third valve seat mounted on said means for operating said second set of cooperating valve members and movable therewith relative to the housing, a fourth valve seat mounted on the wall of the bore, and a second valve poppet slidably mounted in said bore for engagement with said third and fourth valve seats, and first resilient means urging said second valve popper toward said means for operating said second set of valve members, and second resilient mean urging said means for operating said second set of valve members in a direction opposite to that in which the valve poppet is urged by the first resilient means.

6. Dual brake valve comprising a housing having a pair of inlets, a pair of outlets, and an exhaust, said housing defining a bore therewithin, an operator-actuated plunger assembly slidably mounted in said bore, a first set of cooperating valve members mounted in said bore and adapted to control communication between said exhaust, one of said inlets, and a corresponding one of said outlets, a second set of cooperating valve members mounted in said bore and adapted to control communication between said exhaust, the other inlet, and the other outlet, said first set of cooperation valve members including a first valve seat mounted on the wall of the bore, a second valve seat mounted on the plunger assembly, a valve poppet slidably mounted in said plunger assembly for movement relative to the plunger assembly and for movment with the plunger assembly relative to the housing whereby said valve poppet can be moved into and out of sealing engagement with said first and second valve seats, resilient means for urging said valve poppet relative to the plunger assembly, and means operated in response to movement of the plunger assembly for operating said second set of cooperating valve members to control communication between said exhaust, the other inlet and the other outlet, said plunger assembly including a pair of axially spaced, circumferentially extending bearing means slidably engaging the wall of the bore to inhibit twisting of the plunger assembly relative to the housing, said bearing means cooperating with the wall of said bore and the outer surface of said plunger assembly to define an inlet chamber therebetween, said one inlet communicating with said inlet chamber, said bore being stepped to define larger and smaller portions, each of said bearing means defining larger and smaller portions of the plunger assembly and being mounted respectively in the larger and smaller portions of the bore to define a fluid pressure responsive area equal to the difference in the areas of said larger and smaller sections of the plunger assembly, whereby fluid pressure in the inlet chamber acting on said fluide pressure responsive area urges said plunger assembly toward a predetermined position in said housing.

7. Dual circuit brake valve as claimed in claim 6, wherein said plunger assembly and said bore define larger and smaller diameter portions, the larger and smaller portions of the plunger assembly being slidably received in the larger and smaller portions of the bore respectively, the difference between said larger and smaller portions of said plunger assembly defining an effective area, said effective area being communicated to said one inlet whereby fluid pressure communicated through said one inlet acting on said effective area yieldably urges said plunger assembly toward a predetermined position in said bore.

8. Dual circuit brake valve as claimed in claim 6, wherein said means for operating said second set of cooperating valve members includes a stem slidably mounted in said bore, and means for transferring a predetermined load to said stem upon actuation of the plunger assembly.

9. Dual circuit brake valve as claimed in claim 6, wherein said second set of cooperating valve members includes third and fourth valve seats mounted in said bore, a second valve poppet for engagement with said third and fourth valve seats, at least one of said third and fourth valve seats comprising a ring mounted coaxial in said bore, and means releasably mounting said ring within said housing for engagement by said second valve poppet.

10. Dual circuit brake valve as claimed in claim 6, wherein said second set of cooperating valve members includes a third valve seat mounted on said means for operating said second set of cooperating valve members and movable therewith relative to the housing, a fourth valve seat mounted on the wall of the bore, and a second valve poppet slidably mounted in said bore for engagement with said third and fourth valve seats, and first resilient means urging said second valve poppet toward said means for operating said second set of valve members, and second resilient means urging said means for operating said second set of valve members in a direction opposite to that in which the valve poppet is urged by the first resilient means.

* * * * *